(12) United States Patent
Tsumori

(10) Patent No.: US 6,509,989 B1
(45) Date of Patent: Jan. 21, 2003

(54) MODULE FOR BIDIRECTIONAL OPTICAL COMMUNICATION

(75) Inventor: Masahiko Tsumori, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/431,229

(22) Filed: Nov. 1, 1999

(30) Foreign Application Priority Data

Nov. 2, 1998 (JP) ............................................ 10-312606

(51) Int. Cl.⁷ ................................................ H04B 10/00
(52) U.S. Cl. ........................ 359/152; 359/173; 359/124; 359/193; 359/195
(58) Field of Search ................................. 359/152, 173, 359/193, 195, 188, 187, 124

(56) References Cited

U.S. PATENT DOCUMENTS

| | | | |
|---|---|---|---|
| 4,244,045 A | * 1/1981 | Nosu et al. | 359/129 |
| 5,005,935 A | * 4/1991 | Kunikane et al. | 359/129 |
| 5,583,683 A | * 12/1996 | Scobey | 359/127 |
| 5,859,717 A | * 1/1999 | Scobey et al. | 359/124 |
| 6,167,171 A | * 12/2000 | Grasis et al. | 359/126 |
| 6,301,407 B1 | * 10/2001 | Donaldson | 359/124 |

* cited by examiner

Primary Examiner—Jason Chan
Assistant Examiner—Christina Y Leung
(74) Attorney, Agent, or Firm—Arent Fox Kintner Plotkin & Kahn, PLLC

(57) ABSTRACT

A module for bidirectional optical communication includes: a light emitting element for emitting transmitting signal light of the 1.3 μm band and directing the light to an optical transmission line made of optical fibers, for example; a light receiving element having light receiving portions for receiving respectively receiving signal light of the 1.3 μm band and that of the 1.55 μm band which are sent from the optical transmission line; and an optical branching filter interposed between the light emitting element and the light receiving element, and the optical transmission line. The optical branching filter has four different dielectric film portions which split the receiving signal light into 1.3 μm band light and 1.55 μm band light and have respective adjusted reflectances and transmittances, to allow signal light beams of different wavelength bands to be received separately. The resultant module for bidirectional optical communication is of a simple and inexpensive one-packaged structure capable of receiving signals of two different wavelength bands.

8 Claims, 2 Drawing Sheets

MODULE FOR BIDIRECTIONAL OPTICAL COMMUNICATION

FIELD OF THE INVENTION

The present invention relates to a module for bidirectional optical communication capable of performing both transmission and reception used for optical communication or the like. More Particularly, the present invention relates to a module for bidirectional optical communication capable of receiving both wavelength bands of 1.3 µm and 1.55 µm.

BACKGROUND OF THE INVENTION

In recent years, optical fibers have come to be used for communication. Specifically, 1.3 µm band light is used for communication of information between subscribers and a station, while 1.55 µm band light is used for circuits on optical fiber lines. Home modules are therefore construced such that only signals of the 1.3 µm band are utilized for transmission and reception, as conceptually shown in FIG. 3. That is, referring to FIG. 3, a conventional module includes: a light emitting element 5, such as a semiconductor laser, for emitting transmitting signal light; a light receiving element (photodetector) 52, such as a photodiode, for receiving incoming signal light via a half mirror 53; a converging lens 54 for coupling the transmitting (outgoing) signal light reflected by the half mirror 53 to an optical transmission line 55 such as optical fibers; the optical transmission line 55 for transmitting converged light; and a branching filter 56 which transmits nearly 100% of 1.3 µm band light and reflects nearly 100% of 1.55 µm band light. This structure allows transmitting signal light emitted by the light emitting element 51 to be reflected by the half mirror 53, and to be incident on the optical transmission line 55 and finally received by a recipient. In the case of receiving a signal from a sender, the branching filter 56 reflects substantially all of 1.55 µm band light sent from the optical transmission line 55, while transmitting substantially all of 1.3 µm band light. The transmitted incoming signal light then passes through the half mirror 53 to be received by the light receiving element 52 where it is converted to an electric signal. In this way, optical communication is realized. The transmission and reception are alternately switched by time division to avoid interference therebetween.

The conventional module for optical communication is constructed to transmit and receive only 1.3 µm band light as described above. However, a recent trend is that another frequency band of 1.65 µm is used for testing and the 1.55 µm band is used for CATV (community antenna television) communication, to be implied that the 1.55 µm band is to be utilized at home. It is therefore desirable for home modules to have an ability of receiving 1.55 µm band light in addition to 1.3 µm band light. To realize this ability, a construction as shown in FIG. 4 is required, where a module 60 is added to the construction shown in FIG. 3 so that the 1.55 µm band light reflected by the branching filter 56 is reflected again by a total reflection mirror 61 to be received by a light receiving element 62 for the 1.55 µm band. This increases the size of the entire module, as well as increasing the cost thereof.

SUMMARY OF THE INVENTION

In view of these circumstances, it is an object of the present invention to provide a single-packaged simple and inexpensive module for bidirectional optical communication capable of transmitting/receiving a 1.3 µm band signal and receiving a 1.55 µm band signal.

The module for bidirectional optical communication according to the present invention includes: a light emitting element for emitting transmitting signal light of a first frequency band and directing the light to an optical transmission line; a light receiving element having first and second light receiving portions for receiving respectively receiving (incoming) signal light of the first frequency band and that of a second frequency band which are sent from the optical transmission line; and an optical branching filter interposed between, the light emitting element and the light receiving element, and the optical transmission line, wherein the optical branching filter comprises a transparent member having a uniform thickness and a refractive index greater than that of the air, a first dielectric film which transmits substantially 50% of light of the first frequency band while reflecting substantially 50% of light of the first frequency band and transmits substantially 100% of light of the second frequency band being formed on a first portion of a first surface of the transparent member corresponding to an incident portion of the transmitting signal light emitted from the light emitting element, a second dielectric film which transmits substantially 100% of light of the first frequency band and reflects substantially 100% of light of the second frequency band being formed on a second portion of an opposite second surface of the transparent member at which the receiving signal light incident on the first portion from the optical transmission line and passing through the transparent member arrives, a third dielectric film which reflects substantially 100% of light of the second frequency band being formed on a third portion of the first surface of the transparent member at which the light of the second frequency band reflected by the second portion arrives, a fourth dielectric film which transmits substantially 100% of light of the second frequency band being formed on a fourth portion of the second surface of the transparent member at which the light of the second frequency band reflected by the third portion arrives, and the first and second light receiving portions of the light receiving element are arranged so as to receive the light of the first frequency band output from the second portion of the transparent member and the light of the second frequency band output from the fourth portion of the transparent member, respectively.

In one aspect, a reflector is provided for reflecting light which is incident on the first portion of the transparent member from the light emitting element and pass through the transparent member, not being reflected, toward the first light receiving portion of the light receiving element. Due to the time-division switching of transmission and reception, the existing light receiving element can be used for monitoring the power of the light emitting element, eliminating the necessity of an additional light receiving element for automatic power control (APC).

The fourth dielectric film may be formed so as to have the same transmittance and reflectance as the first dielectric film and the third dielectric film may be formed so as to have the same transmittance and reflectance as the second dielectric film. This simplifies the film-formation process, and also eliminates the necessity of distinguishing one surface from the other during assembly by setting the film-formation portions of the opposite surfaces at positions symmetrical to each other with respect to a center point.

The third dielectric film may be a total reflection film, and/or the fourth dielectric film may be a transparent film or no fourth dielectric film may be formed. With these constructions, one surface can be distinguished from the other at a glance, simplifying the work in the assembly process.

The light receiving element is preferably composed of a single chip semiconductor device having the first light receiving portion and the second light receiving portion. This allows for compact construction.

A face of the light emitting element is preferably arranged to be tilted from a 90° position with respect to an optical path of the receiving signal light output from the optical transmission line and reflected by the optical branching filter. And a face of the light receiving element is preferably arranged to be tilted from a 90° position with respect to an optical path of the receiving signal light output from the optical transmission line and transmitted by the optical branching filter. This prevents the light from the optical transmission line from returning to the optical transmission line by being reflected by the face of the light emitting element or the light receiving element, avoiding generation of noise.

Other objects and advantages of the invention will become apparent to those skilled in the art from the following detailed description with reference to the accompanying drawings.

DESCRIPTION OF THE PREFERRED EMBODIMENTS

Figure 1:
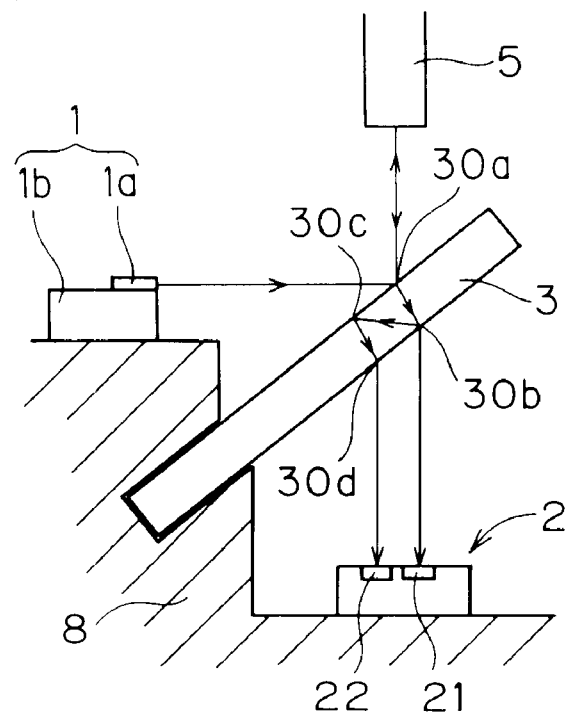
FIG. 1 is a view illustrating an exemplary construction of an embodiment of the module for optical communication according to the present invention.
Figure 2:
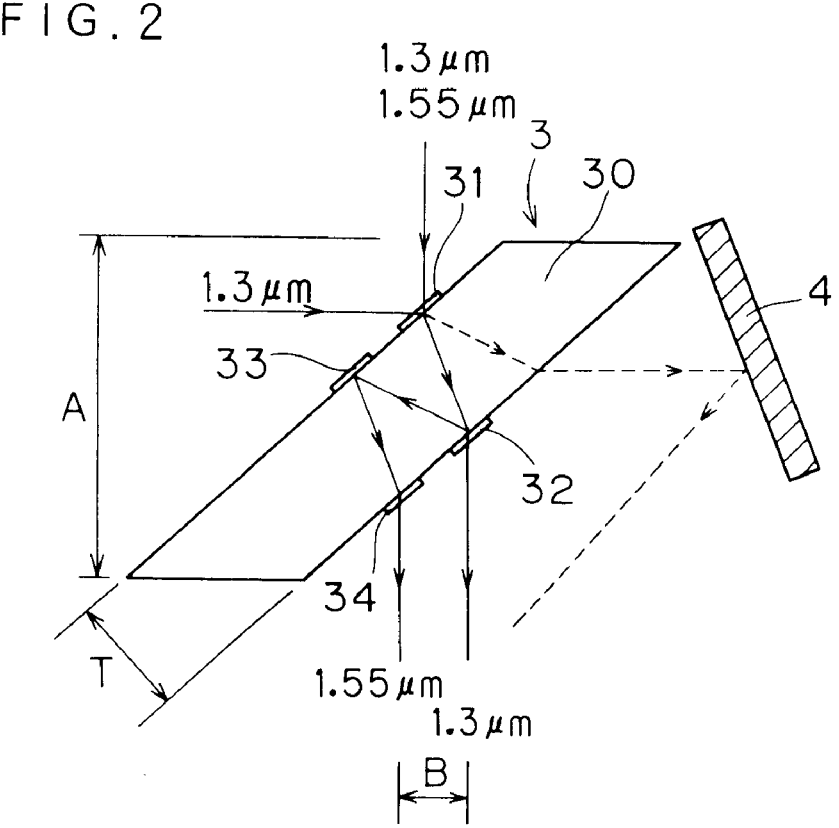
FIG. 2 is an enlarged view of an optical branching filter shown in FIG. 1 for illustrating the construction thereof and splitting of light in more detail.
Figure 3:
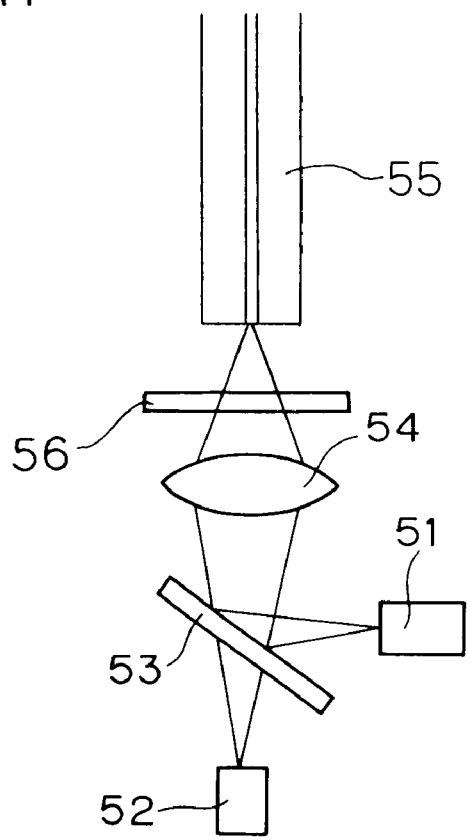
FIG. 3 is a view illustrating an exemplary construction of a conventional optical module.
Figure 4:
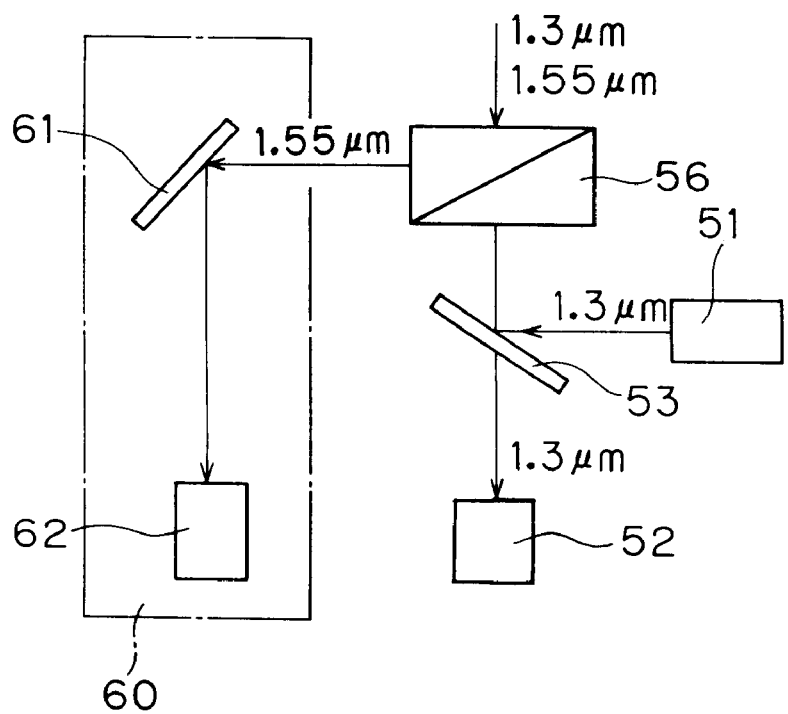
FIG. 4 is a view illustrating an exemplary construction of a conventional module for receiving 1.55 μm band light.

FIGS. 1 and 2 show an embodiment of the module for bidirectional optical communication according to the present invention. The module includes: a light emitting element 1 which emits transmitting signal (outgoing signal) light of a first frequency band, i.e., 1.3 μm band, and directs the light to an optical transmission line 5 composed of optical fibers, for example; a light receiving element 2 having first and second light receiving portions 21 and 22 which receive incoming signal (receiving signal) light of the first frequency band and that of a second frequency band, i.e., 1.55 μm band, respectively, sent from the optical transmission line 5; and an optical branching filter 3 interposed between the light emitting element 1 and the light receiving element 2, and the optical transmission line 5.

Referring to FIGS. 2 and 1, the optical branching filter 3 includes a transparent member 30 having a uniform thickness and a refractive index greater than that of the air. A first dielectric film 31 is formed on a first portion 30a of a first surface of the transparent member 30 corresponding to the incident portion of the transmitting signal light emitted by the light emitting element 1. The first dielectric film 31 transmits substantially 50% of light of the first frequency band while reflecting substantially 50% thereof and transmits substantially 100% of light of the second frequency band. Likewise, a second dielectric film 32 is formed on a second portion 30b of the opposite second surface of the transparent member 30 at which receiving signal light incident on the first portion 30a from the optical transmission line 5 arrives through the transparent member 30. The second dielectric film 32 transmits substantially 100% of light of the first frequency band and reflects substantially 100% of light of the second frequency band. A third dielectric film 33 is formed on a third portion 30c of the first surface of the transparent member 30 at which the light of the second frequency band reflected by the second portion 30b arrives through the transparent member 30. The third dielectric film 33 reflects substantially 100% of light of the second frequency band. A fourth dielectric film 34 is formed on a fourth portion 30d of the second surface of the transparent member 30 at which the light of the second frequency band reflected by the third portion 30c arrives through the transparent member 30. The fourth dielectric film 34 transmits substantially 100% of light of the second frequency band. The light receiving portions 21 and 22 of the light receiving element 2 are constructed to receive the light of the first frequency band output from the second portion 30b of the transparent member 30 and the light of the second frequency band output from the fourth portion 30d of the transparent member 30.

The optical branching filter 3 will be described in more detail with reference to FIG. 2. The optical branching filter 3 is essentially composed of the transparent member 30 made of a glass plate (e.g., SHOT Co.,'s glass code BK7 having a refractive index n of 1.4 for a wavelength of 1.3 μm) having a thickness of about 270 μm and both a width A and a length (perpendicular to the plane of the FIG. 2) of about 680 μm, with the dielectric films 31 to 34 having respective adjusted reflectances being partially formed on the surfaces thereof. The reflectance of each of the dielectric films 31 to 34 for a desired frequency band can be adjusted by constructing the dielectric film as a multilayer structure composed of layers of $SiO_2$, $TiO_2$, $MgF_2$, $Al_2O_3$, and the like, for example, and varying the thicknesses of the layers. In this way, the reflectance and transmittance of each dielectric film can be adjusted for the above two frequency bands. Such dielectric films can be formed by vacuum evaporation, CVD, or the like.

The dielectric films 31 to 34 of different types are formed in the following manner. First, the first dielectric film 31 is formed on the first portion 30a of a first surface of the transparent member 30 so that it transmits substantially 50% of 1.3 μm band light while reflecting substantially 50% thereof and transmits substantially 100% of 1.55 μm band light. This reflection and transmission relationship can be realized by appropriately selecting the combination of the dielectrics to be used and the thickness of each dielectric layer. The first portion 30a corresponds to the portion of the first surface of the transparent member 30 on which light emitted by the light emitting element 1 is incident when the light emitting element 1 and the optical branching filter 3 are arranged as shown in FIG. 1, and has an area of about several hundred square micrometers. The first dielectric film 31 can be formed on this portion by either a lift-off method or an etching method. In the lift-off method, a mask is formed to cover the entire surface except for the first portion 30a and removed after the dielectric film is formed. In the etching method, a dielectric film is formed over the entire surface and then partially etched away so that the only desired portion is remained.

Next, the second dielectric film 32 is formed on the second portion 30b of the opposite second surface of the transparent member 30 so that it transmits substantially 100% of 1.3 μm band light and reflects substantially 100% of 1.55 μm band light. This dielectric film is formed in the manner described above while the reflectance thereof being adjusted. The second portion 30b corresponds to the portion of the second surface of the transparent member 30 on which the receiving signal light from the optical transmission line 5 transmitted by the first dielectric film 31 is incident. The second portion 30b can be positioned precisely by the Snell's law based on the incident angle of the receiving signal light at the optical branching filter 3 and the refractive index n and the thickness T of the transparent member 30. The area of the portion on which the second dielectric film 32 is formed is the same as that described above.

The third dielectric film 33 which transmits substantially 100% of 1.55 μm band light (a total reflection film may be used) is formed on the third portion 30c of the first surface of the transparent member 30 in the manner described above. In the case of a total reflection film, the film 33 may be a single-layer film made of Ag, Au, or the like, not a multilayer dielectric film as described above. The third portion 30c corresponds to the portion of the first surface of the transparent member 30 on which the 1.55 μm band light total-reflected by the second dielectric film 32 is incident. The third portion 30c can also be positioned precisely based on the thickness T of the transparent member 30 and the incident angle of the receiving signal light at the second dielectric film 32 (which is equal to the refracting angle of the light transmitted by the first dielectric film 31).

The fourth dielectric film 34 which transmits substantially 100% of 1.55 μm band light is formed (a transparent piece may be used or even nothing may be formed) on the fourth portion 30d of the second surface of the transparent member 30 in the manner described above. The fourth portion 30d corresponds to the portion of the second surface of the transparent member 30 at which the 1.55 μm band light total-reflected by the third dielectric film 33 arrives.

The third dielectric film 33 can be the same as the second dielectric film 32 since a component of the first frequency band hardly exists in the light incident on the third dielectric film 33 or can be further separated if existing. Likewise, the fourth dielectric film 34 can be the same as the first dielectric film 31. By adopting this construction, the dielectric films on the two opposite surfaces can be formed in the same manner, simplifying the film-formation process and eliminating the necessity of distinguishing one surface from the other during assembly.

As described above, once the positional relationship among the light emitting element 1, the optical transmission line 5, and the optical branching filter 3 and the material (refractive index) and the thickness T of the transparent member 30 are determined, the first portion 30a and then the second to fourth portions 30b to 30d of the transparent member 30 can be positioned. The dielectric films 31 to 34 having the above-described relationships are then formed on the respective portions, thus to obtain the optical branching filter 3 shown in FIG. 1. The distance B (FIG. 2) between the receiving signal light paths of 1.3 μm band light and 1.55 μm band light which are to be incident on the light receiving element 2 can also be adjusted based on the thickness T and the refractive index n of the transparent member 30. Specifically, the distance B is 200 μm when the transparent member 30 of this example is used.

The light emitting element 1 is, for example, a semiconductor laser which includes a laser diode chip 1a of a double-heterojunction structure and a sub-mount 1b made of silicon and the like to which the laser diode chip 1a is bonded. The laser diode chip 1a includes an active layer of a multiple quantum well structure sandwiched by cladding layers made of an InP compound semiconductor. The light emitting element 1 converts an transmitting signal to a light signal of the 1.3 μm band and emits the light. Such a light emitting element 1 is mounted on a header 8, for example, as shown in FIG. 1. The light emitting element 1 incorporates an automatic power control (APC) circuit in a driving circuit thereof, which monitors the power of the light emitting element and automatically controls the irradiation power to a constant value.

The light receiving element 2 is, for example, a photodiode made of InP, which includes the first light receiving portion 21 for receiving light of the 1.3 μm band as the first frequency band and the second light receiving portion 22 for receiving light of the 1.55 μm band as the second frequency band. The distance between the centers of the light receiving portions 21 and 22 is about 200 μm when the above transparent member 30 is used as described above. The first and second light receiving portions 21 and 22 are the same in structure but are separated in electricity from each other for separate 10 signal processing. Alternatively, the first and second light receiving portions 21 and 22 may be constructed as independent light receiving elements. Such light receiving portions 21 and 22 are formed so as to be separated from each other by the distance between the paths of light transmitted by the second dielectric film 32 and the fourth dielectric film 34 of the optical branching filter 3.

FIG. 2 also shows a reflector 4 made of a metal plate, for example, interposed on a path of light which is incident on the optical branching filter 3 from the light emitting element 1, is transmitted by the first dielectric film 31, and passes through the transparent member 30 to exit from the opposite surface of the transparent member 30 (the optical path shown by the dashed line). The reflection angle of the reflector 4 is adjusted so that reflected light be incident on the first light receiving portion 21 of the light receiving element 2. The first dielectric film 31 reflects a half of 1.3 μm band light while transmitting the other half, as described above. Therefore, while a half is coupled to the optical transmission line 5, the other half is transmitted through the transparent member 30. This transmitted light can be utilized for monitoring the power of the light emitting element 1 to operate the APC of the light emitting element 1. The light receiving element 2, which intrinsically receives receiving signal light, receives no receiving signal light during transmission due to the time-divided alternate transmission and receiving operation. It is therefore possible to utilize the first light receiving portion 21 of the light receiving element 2 as a monitor of transmission during the transmission period. This eliminates the necessity of an additional light receiving element for monitoring which is otherwise required to be interposed behind the light emitting element 1.

Although not shown in detail in the exemplary structure shown in the FIGS. 1 and 2, the light emitting face of the light emitting element 1 and the light receiving face of the light receiving element 2 are slightly tilted with respect to the direction of the light beam. This is because, if the light emitting face and the light receiving face are perpendicular to the beam direction shown by the solid lines in the figures, the receiving signal light may be reflected right back resulting in passing along the path the light has just propagated in the reverse direction to return to the optical transmission line 5. If the receiving signal light returns to the optical transmission line 5, it then returns to the transmission (sender) side generating noise. It is therefore preferable to arrange the light emitting face and the light receiving face in a slightly tilted state. This tilt arrangement however reduces the efficiency slightly since emitted light and receiving light are totally usable only when the light emitting face and the light receiving face are arranged perpendicular to the beam direction.

According to the module for optical transmission of the present invention, about a half of the transmitting signal light incident on the first portion 30a of the optical branching filter 3 is reflected by the first dielectric film 31 to be coupled to the optical transmission line 5. Meanwhile, about a half of the receiving signal light of the 1.3 μm band sent from the optical transmission line 5 and incident on the first dielectric film 31 passes through the transparent member 30 while the other half being reflected toward the light emitting element 1. At this time, substantially all of the receiving signal light of the 1.55 μm band passes through the transparent member 30.

The receiving signal light which passes through the transparent member 30 arrives at the second portion 30b of the transparent member 30. All of the receiving signal light of the 1.3 μm band is transmitted by the second dielectric film 32 and is incident on the first light receiving portion 21 of the light receiving element 2 to be converted to an electric signal. Thus, the receiving signal light of the 1.3 μm band is received. Meanwhile, the receiving signal light of the 1.55 μm band is mostly reflected by the second dielectric film 32, then mostly reflected by the third dielectric film 33, and finally passed through the dielectric film 34. The resultant light is incident on the second light receiving portion 22 of the light receiving element 2 to be converted to an electric signal. Thus, the receiving signal light of the 1.55 μm band is received.

The light from the light emitting element 1 which has been passed through the first dielectric film 31 may be reflected by the reflector 4 to be directed to the first light receiving portion 21 of the light receiving element 2 for use in monitoring the power of the light emitting element 1. This construction contributes to further reduction of the size and cost of the module.

Thus, according to the present invention, an inexpensive and compact-structure module for bidirectional optical communication capable of transmitting and receiving 1.3 μm band light and receiving 1.55 μm band light is realized. This makes it possible to transmit/receive signals for telephone and facsimile and receive signals for CATV simultaneously, thereby greatly contributing to implementation of optical communication.

Many modifications and variations of the present invention will be apparent to those skilled in the art without departing from the scope and spirit of the invention. It should therefore be understood that the present invention is not limited to the specific embodiment illustrated herein but only defined by the appended claims.

What is claimed is:

1. A module for bidirectional optical communication, comprising:

a light emitting element for emitting transmitting signal light of a first frequency band and directing the light to an optical transmission line;

a light receiving element having first and second light receiving portions for receiving respectively receiving signal light of said first frequency band and that of said second frequency band which are sent from an optical transmission line; and an optical branching filter interposed between said light emitting element and said light receiving element, and said optical transmission line, wherein said optical branching filter comprises a transparent member having a uniform thickness and a refractive index greater than that of the air, a first dielectric film which transmits substantially 50% of light of said first frequency band while reflecting substantially 50% of light of said first frequency band and transmits substantially 100% of light of said second frequency band being formed on a first portion of a first surface of said transparent member corresponding to an incident portion of said transmitting signal light emitted from said light emitting element, a second dielectric film which transmits substantially 100% of light of said first frequency band and reflects substantially 100% of light of said second frequency band being formed on a second portion of an opposite second surface of said transparent member at which said receiving signal light incident on said first portion from said optical transmission line and passing through said transparent member arrives, a third dielectric film which reflects substantially 100% of light of said second frequency band being formed on a third portion of said first surface of said transparent member at which the light of said second frequency band reflected by said second portion arrives, a fourth dielectric film which transmits substantially 100% of light of said second frequency band being formed on a fourth portion of said second surface of said transparent member at which the light of said second frequency band reflected by said third portion arrives, and said first and second light receiving portions of said light receiving element are arranged so as to receive the light of said first frequency band output from said second portion of said transparent member and the light of said second frequency band output from said fourth portion of said transparent member, respectively.

2. A module according to claim 1, further comprising a reflector for reflecting light which is incident on said first portion of said transparent member from said light emitting element and pass through said transparent member, not being reflected, toward said first light receiving portion of said light receiving element.

3. A module according to claim 1, wherein said fourth dielectric film is formed so as to have the same transmittance and reflectance as said first dielectric film, and said third dielectric film is formed so as to have the same transmittance and reflectance as said second dielectric film.

4. A module according to claim 1, wherein said third dielectric film comprises a total reflection film.

5. A module according to claim 1, wherein said fourth dielectric film is a transparent film or no fourth dielectric film is formed.

6. A module according to claim 1, wherein said light receiving element comprises a single-chip semiconductor device having said first light receiving portion and said second light receiving portion.

7. A module according to claim 1, wherein a face of said light emitting element is arranged to be tilted from a 90° position with respect to an optical path of said receiving signal light output from said optical transmission line and reflected by said optical branching filter.

8. A module according to claim 1, wherein a face of said light receiving element is arranged to be tilted from a 90° position with respect to an optical path of said receiving signal light output from said optical transmission line and transmitted by said optical branching filter.

* * * * *